(12) United States Patent
Li

(10) Patent No.: US 11,852,773 B2
(45) Date of Patent: Dec. 26, 2023

(54) INSTRUMENT STRUCTURE AND MEASURING METHOD FOR CROSS-CASING RESISTIVITY TOOL

(71) Applicant: Shanjun Li, Katy, TX (US)

(72) Inventor: Shanjun Li, Katy, TX (US)

(*) Notice: Subject to any disclaimer, the term of this patent is extended or adjusted under 35 U.S.C. 154(b) by 0 days.

(21) Appl. No.: 17/726,516

(22) Filed: Apr. 21, 2022

(65) Prior Publication Data

US 2023/0341580 A1    Oct. 26, 2023

(51) Int. Cl.
*G01V 3/24*    (2006.01)
*G01V 3/10*    (2006.01)
*G01V 3/38*    (2006.01)

(52) U.S. Cl.
CPC .......... *G01V 3/24* (2013.01); *G01V 3/10* (2013.01); *G01V 3/38* (2013.01)

(58) Field of Classification Search
CPC .......... G01V 3/24; G01V 3/10; G01V 3/38
See application file for complete search history.

(56) References Cited

U.S. PATENT DOCUMENTS

| | | | |
|---|---|---|---|
| 6,246,240 B1 * | 6/2001 | Vail, III | G01V 11/00 324/368 |
| 11,249,216 B2 | 2/2022 | Li | |
| 2016/0265346 A1 * | 9/2016 | Han | E21B 47/125 |
| 2020/0183043 A1 * | 6/2020 | Li | G01V 3/20 |

* cited by examiner

*Primary Examiner* — Son T Le
*Assistant Examiner* — Adam S Clarke
(74) *Attorney, Agent, or Firm* — MagStone Law, LLP; Enshan Hong

(57) ABSTRACT

The present application provides a device and method for determining formation resistivity outside casing. The device measures the electrical signal of alternating current flowing along the casing, and then calculates phase velocity, group velocity, time difference, amplitude attenuation, and phase difference of the alternating current along the casing. Using these relationships between phase velocity, group velocity, time differences, amplitude attenuation, and phase difference, the formation resistivity outside the casing is calculated.

21 Claims, 19 Drawing Sheets

ID OF THE INVENTION

The present application relates to the field of measuring formation resistivity from behind a casing, which can be referred to as Cased Hole Formation Resistivity or Resistivity Behind Casing. More specifically, in one embodiment, there are provided designs of electromagnetic (EM) cross casing resistivity tools and signal measurement that can provide measurements of formation resistivity from behind a casing.

BACKGROUND OF THE INVENTION

After years of production, the owner of an oil and gas reservoir, usually an oil company needs to re-evaluate the reservoir for information, such as water saturation of the reservoir. The resistivity of the reservoir is a key parameter used to compute the saturation. In order to obtain resistivity, some cross casing resistivity tools have been developed by oil service companies. The operation principle of the tools is to measure an electric field with three electrodes that are completely attached to the casing, and the measurement can be converted to reservoir resistivity beyond the casing. The current operation principle has shortcomings, such as slow logging speed, requiring complete touch between measuring electrodes and casing, and the problems in the casing itself. Hence, there is a need for improved methods and systems for cross casing resistivity logging tools.

U.S. patent Ser. No. 11/249,216 B2 of Shanjun Li discloses a measurement method, which calculates the formation resistivity outside the casing by measuring the phase velocity, phase difference, amplitude attenuation, time difference while an alternating current flowing along the casing. However, this patent does not provide a method to measure the phase velocity, phase difference, amplitude attenuation, time difference when the alternating current flows outside the casing.

Therefore, there is a need to further design an instrument structure and a measurement method.

SUMMARY OF THE INVENTION

In the present invention, a new methodology is presented, which measures alternating current signals, including current, voltage, electric field, and magnetic field in frequency domain or time domain, to compute current speed, time difference, phase difference, and current amplitude decay instead of measuring voltage only. The speed, phase deference, and current amplitude decay have a relationship with formation resistivity outside of the casing, which can be used to compute the formation resistivity more efficiently.

The present invention provides a structure and a measuring method for cross-casing resistivity tool. Instead of measuring voltage used by the operation principle of the current method, in an embodiment, the present invention measures the current flow velocity, time difference, the current flowing between electrodes, phase difference, and current amplitude attenuation on the casing which are used to calculate the formation resistivity outside the casing.

One aspect of the present application is a device for measuring cross casing resistivity comprising at least one electrode transmitter, at least one electrode monitor, a current measuring circuit for measuring alternating current signal flowing through the electrode monitor along the casing, a power source, and a processor configured for calculating a parameter for current propagation along the casing based on the alternating current signal and for calculating resistivity of formation outside the casing based on at least one of the parameter for current propagation along the casing, and:

the electrode monitor and/or the electrode transmitter is installed with the current measuring circuit;

the alternating current signal is selected from the group consisting of amplitude, phase, and combinations thereof;

alternating current emitted by the electrode transmitter partially or entirely flows through the electrode monitor back to the power source, and the parameter for current propagation along the casing is selected from the group consisting of time difference, phase velocity, group velocity, phase difference, amplitude attenuation, and combinations thereof.

Another aspect of the present application is a method of measuring cross casing resistivity comprising:

measuring alternating current signal flowing through at least one electrode monitor along the casing;

calculating via a processor at least one parameter for current propagation along the casing based on the alternating current signal measured in step 1); and calculating resistivity of formation outside the casing based on the at least one parameter for current propagation along the casing, in which:

the alternating current signal is selected from the group consisting of amplitude, phase, and a combination thereof; and the parameter for current propagation along the casing is selected from the group consisting of time difference, phase velocity, phase difference, amplitude attenuation, and combinations thereof.

BRIEF DESCRIPTION OF THE DRAWINGS

One can obtain a better understanding of the present invention from the following detailed description of various embodiments. The attached drawings are only examples.

The drawings and following detail description are just examples to understand the present invention which is susceptible to various modifications and alternating forms. It should be understood, however, that the drawings and detailed description thereof are not intended to limit the scope of the appended claims.

DETAILED DESCRIPTION OF PREFERRED EMBODIMENTS

As used herein, "alternating current" refers to an electric current that periodically reverses direction and changes its magnitude continuously with time or electric current pulse.

As used herein, "current measuring unit" refers to a device for measuring the alternating current signal on the wire in frequency domain or time domain.

As used herein, "cross casing resistivity" refers to measuring the resistivity of the formation outside the casing.

As used herein, "electrode" refers to a solid electrical conductor or a group of conductors through which current flows into or out of a power source or other medium. A set of electrical conductors consists of multiple electrical conductors with different azimuth angles.

As used herein, "electrode module" comprises electrodes and wires that are connected to the control circuit of the instrument and allow current to flow in or out of the electrode.

As used herein, "electrode transmitter" refers to electrode or electrode module used as a transmitter.

As used herein, "electrode monitor" refers to electrode or electrode module used as a monitor.

As used herein, "monitoring electrode module" comprises electrodes and wires that are connected to the control circuit of the instrument and allow current to flow from the electrodes.

As used herein, "transmitting electrode module" comprises electrodes and wires that are connected to the control circuit of the instrument and allow current to flow out of the electrode.

As used herein, "power" or "power system" refers to AC power.

As used herein, "alternating current signal" refers to current, voltage, electric field, and magnetic field.

Figure 1:
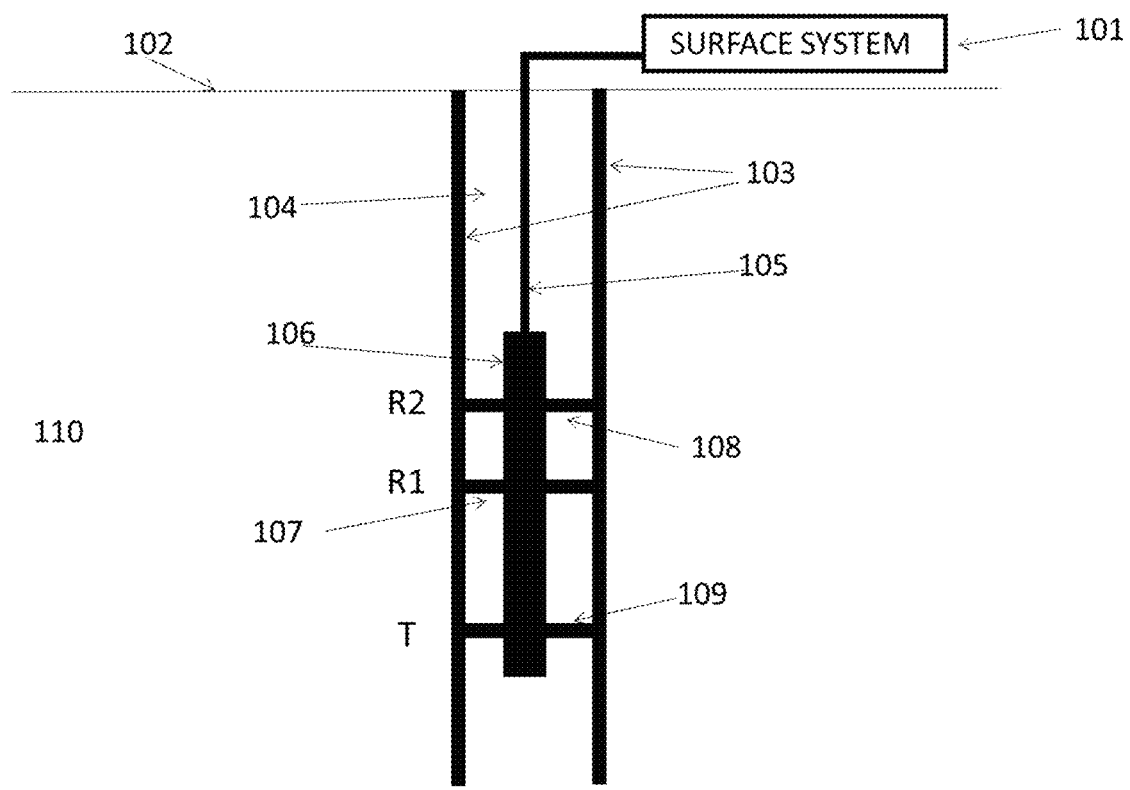
FIG. 1 shows one example of a new cross casing resistivity tool's structure.

FIG. 1 shows an example of a through casing resistivity device configuration. A cased hole, represented by casing 103, is in formation 110, the earth's surface 102 separates the air from the formation 110, and a surface control system 101 is placed on the surface, which may include power systems/sources for powering downhole devices, control systems, and/or computers for collecting, storing and processing measurement data. The surface control system is linked with device 106 by a cable 105 placed within the wellbore 104. A transmitting electrode module T 109 and monitoring electrode module R1 107 and monitoring electrode module R2 108 are installed on the device 106.

Figure 2A:
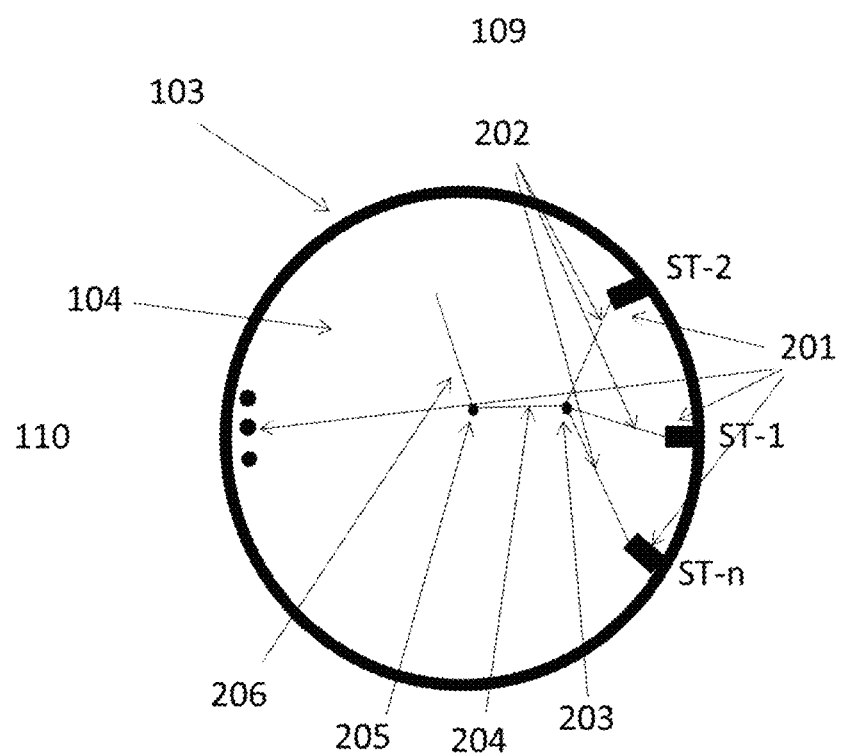
FIG. 2(a) shows an example of the transmitting electrode module.

FIG. 2(a) shows an example of the transmitting electrode module T 109. The transmitting electrode module T 109 includes one or more sub-electrodes ST-1, ST-2, . . . , ST-n 201 which are located in borehole 104 formed by casing 103 and may not be connected with casing 103 totally. These sub-electrodes are connected together 203 by conductive wire 202 and then connected to the current control circuit 205 in the device by conductive wire 204, the control circuit is connected to the ground control system by conductive wire 206, the conductive wire 206 is in the cable 105.

Figure 2B:
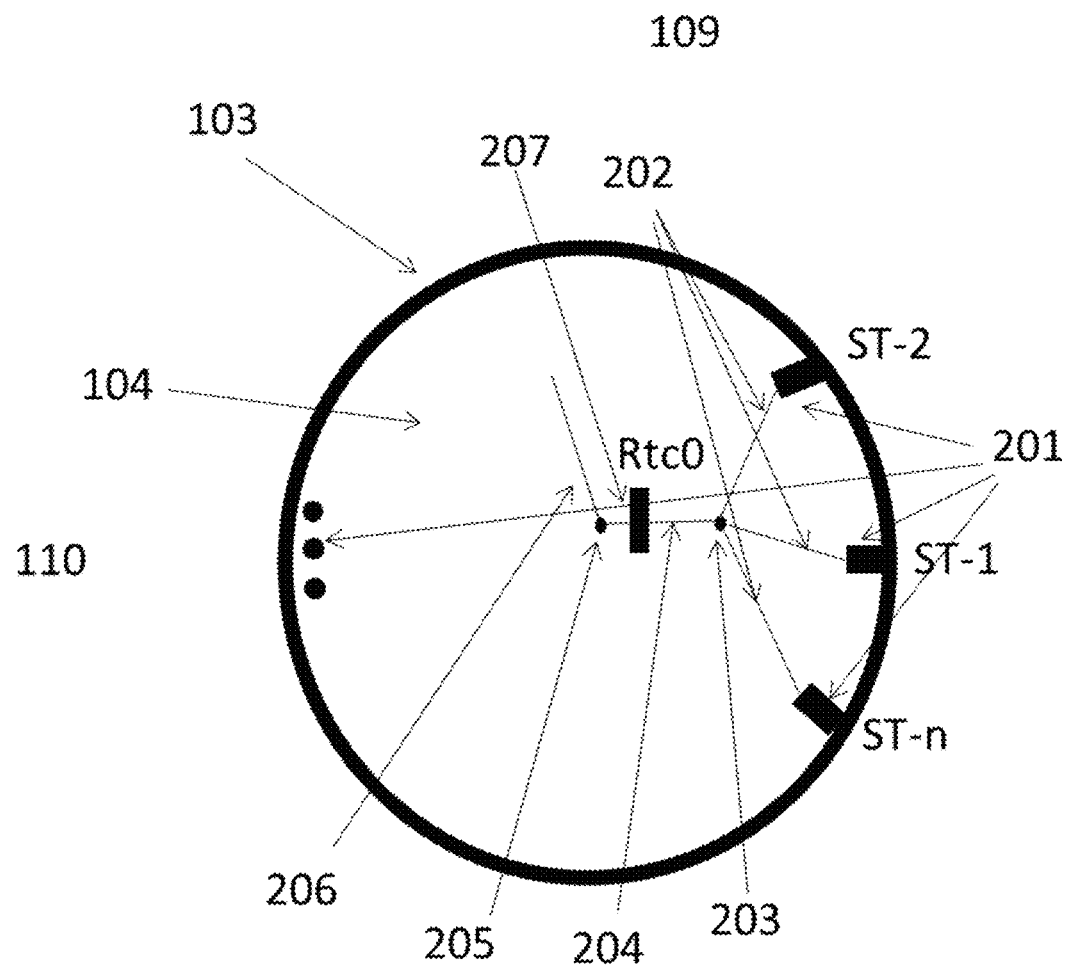
FIG. 2(b) shows an example of a current measuring circuit installed in the transmitting electrode module.

FIG. 2(b) shows an example of a current measuring circuit installed in the transmitting electrode module T 109. A current measuring circuit Rtc0 207 is installed at the conductive line 204 in FIG. 2(a). The current measuring circuit is used to measure the alternating current signals, including amplitude and phase, emitted by the transmitting electrode module.

Figure 3A:
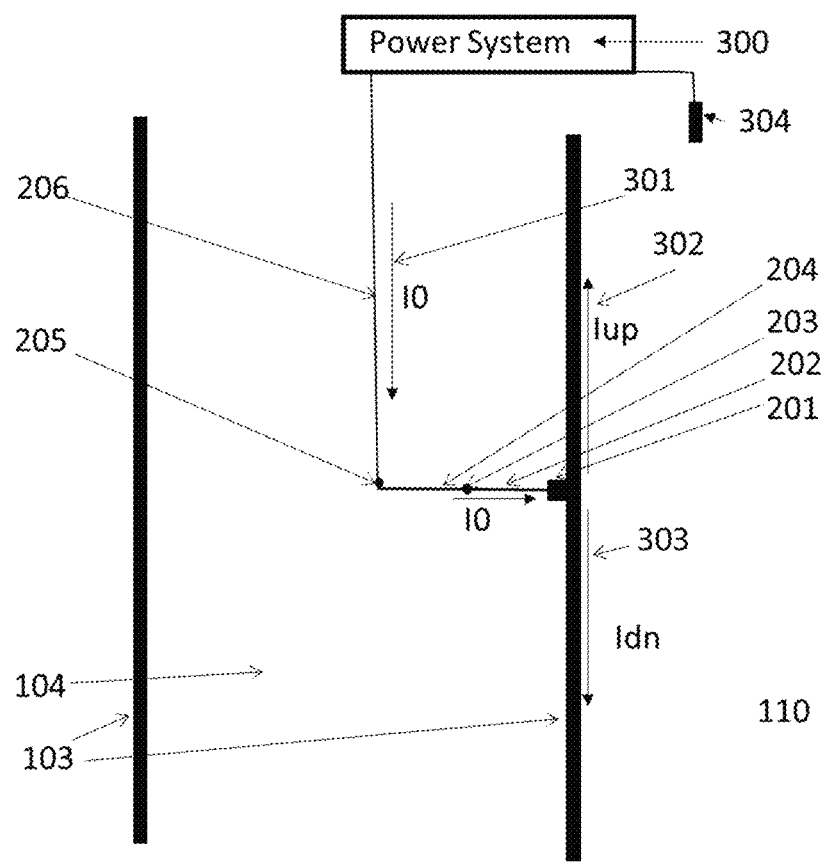
FIG. 3(a) shows the operation principle of the transmitting electrode module shown in FIG. 2(a)

FIG. 3(a) shows the operation principle of the transmitting electrode module shown in FIG. 2(a). An alternating current I0 301, supplied by the power system 300, flows along wire 206 and reaches the current control circuit 205. The alternating current I0 301 enters the casing through the sub-transmitting electrode 201, and then splits into two parts: the current Iup 302 flowing upward and the current Idn 303 flowing downward, and then gradually flows into the formation, and finally flows back to the power system through electrode 304, form a loop.

Figure 3B:
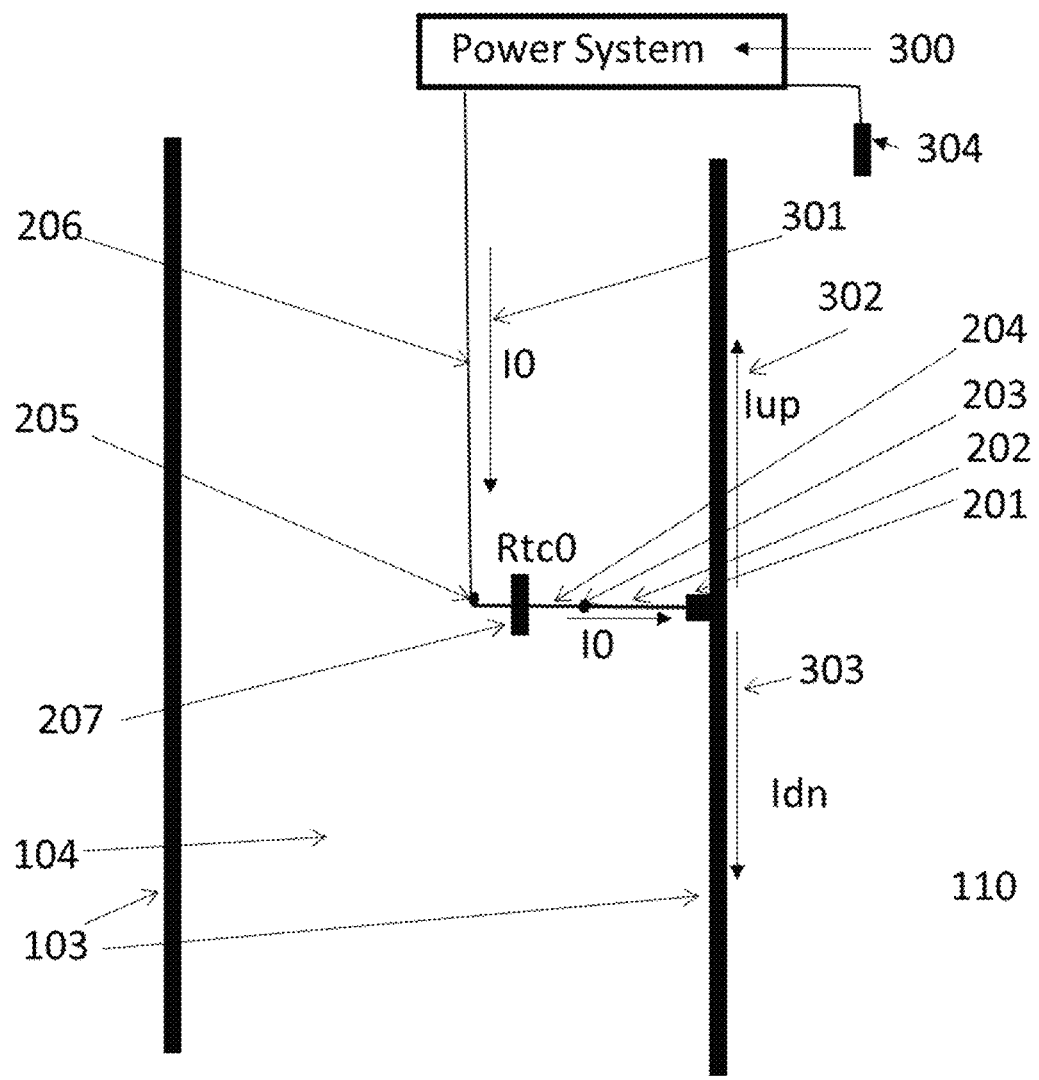
FIG. 3(b) Shows a current measuring circuit installed in the transmitting electrode module shown in FIG. 3(a)

FIG. 3(b) Shows a current measuring circuit installed in the transmitting electrode module shown in FIG. 3(a). The alternating current I0 301 supplied by the control system 300 reaches the current control circuit 205 along the wire 206, and then enters the casing through the conductive wire 204 and the sub-transmitting electrode 201, and the current measuring circuit 207 is installed on the conductive wire 204, and then is divided into two parts: the upward flowing current Iup 302 and the downward flowing current Idn 303, and then gradually flows into the formation, and finally flows back to the power system through electrode 304, forming a loop. When the current passes through the conductive wire 204, the alternating current signal measured by the current measuring circuit 207 is defined as:

$$V_0 = A_0 e^{i\theta_0}. \tag{1}$$

Figure 4A:
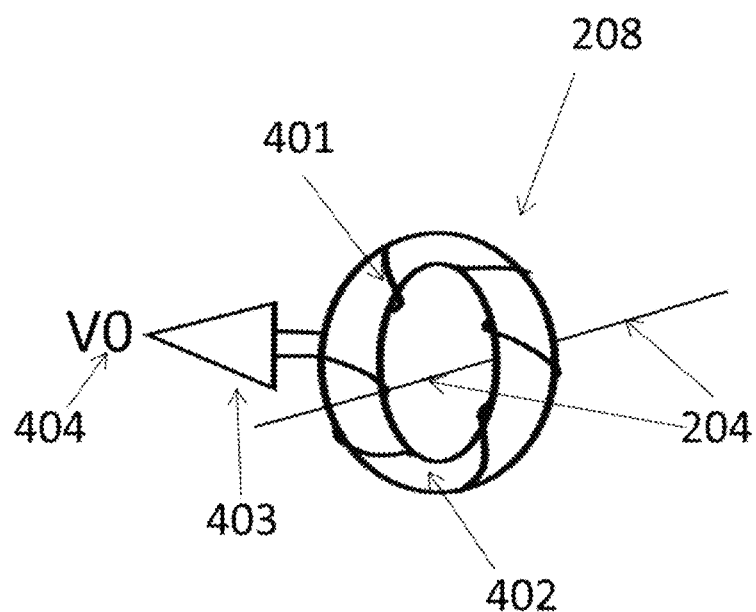
FIG. 4(a) shows one example of a current measuring circuit: a toroid coil system.

FIG. 4(a) shows an example of a current measuring circuit 207, a toroid coil system. The conductive wire 401 is wound on the annular medium 402 and then connected to the measuring circuit 403, and the wire 204 passes through the inside of the toroid coil. When a current passes through the wire 204, the toroid coil will have an induced voltage, and the measuring circuit will measure the induced voltage $V_0$ 404. The induced voltage $V_0$ 404 reflects the parameters of the alternating current flowing through the wire 204: magnitude and phase. The annular medium 402 can be made of any material, but magnetic medium is preferred.

Figure 4B:
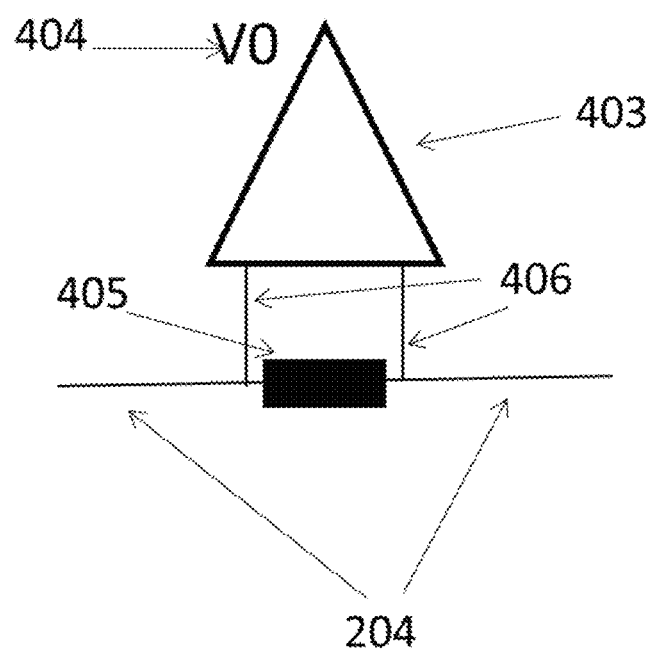
FIG. 4(b) shows another example of current measuring circuit: resistance system.

FIG. 4(b) shows another example of current measuring circuit 207, a resistance system. The resistor 405 is connected in series on the wire 204, and a wire 406 is added at both sides of the resistor 405 to connect to the measurement circuit 403. When a current passes through the wire 204, there will be a potential difference $V_0$ 404 across the resistor

405, and the potential difference $V_0$ 404 will reflect the current parameters: magnitude and phase.

Note: FIGS. 4*a* and 4*b* show only two examples of "current measuring circuit", and this patent is not limited to these two current measuring circuits.

Figure 5:
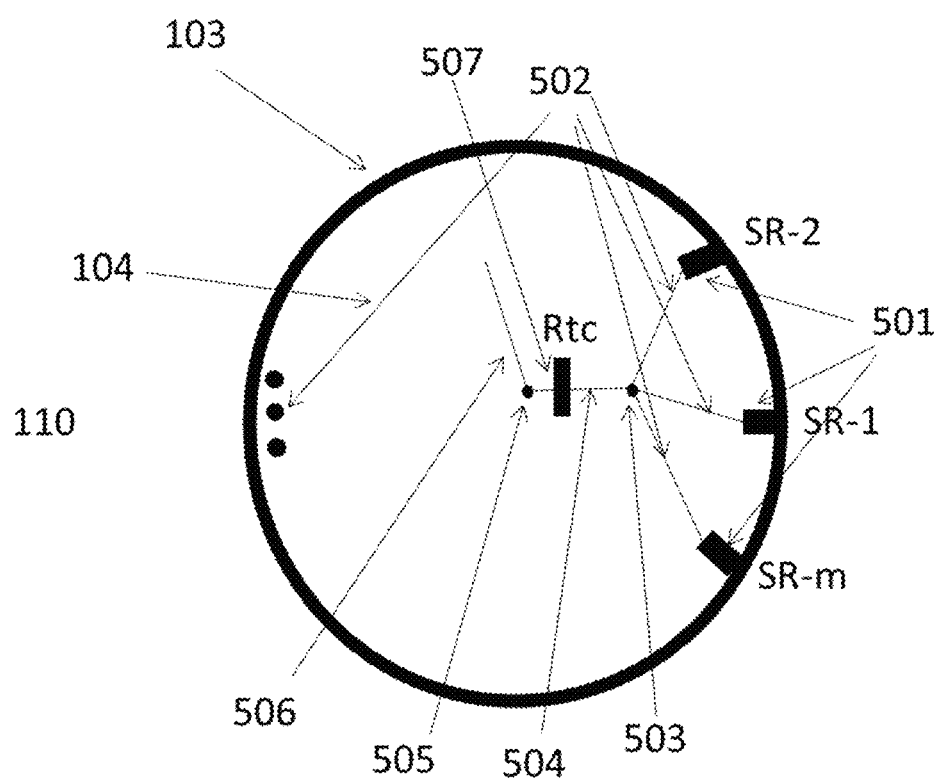
FIG. 5 shows a structure of the monitoring electrode module.

FIG. 5 shows the structure of the monitoring electrode module. The monitoring electrode module, such as R1 107, R2 108, includes one or more sub-monitoring electrodes SR-1, SR-2, ..., SR-m 501. It may be in contact with the casing 103 in whole or in part, or may not be in contact with the casing 103 at all. These sub-monitoring electrodes are connected together 503 by conductive wire 502, and then connected to the control circuit 505 of the device by conductive wire 504. The control circuit is connected to the control system through conductive wire 506, and/or connected to casing 103, and/or connected to other electrodes on the surface. A current measuring circuit Rtc 508 is installed on the wire 504.

Figure 6:
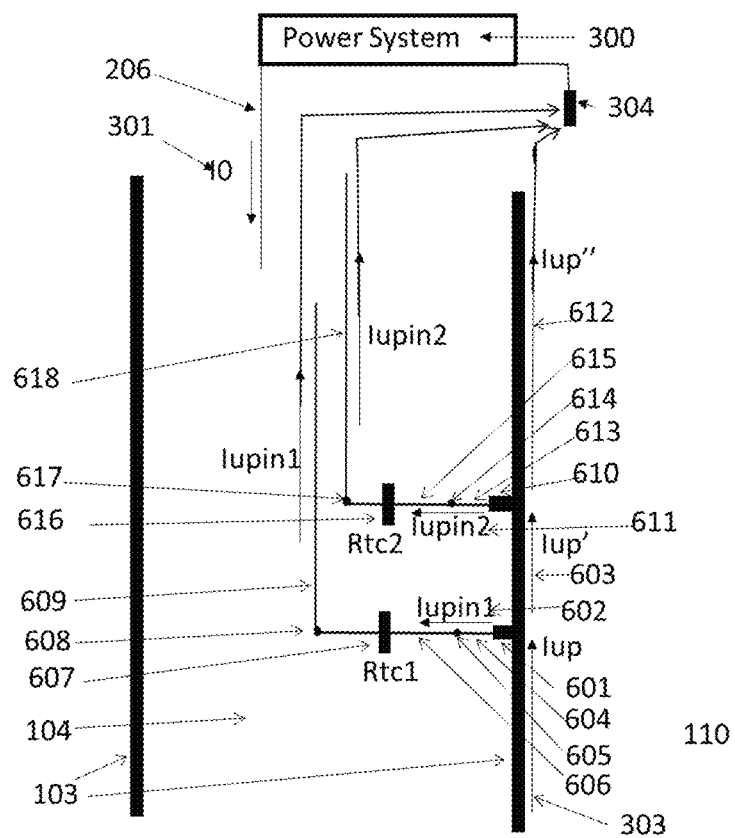
FIG. 6 shows the operation principle of monitoring electrode modules.
Figure 7A:
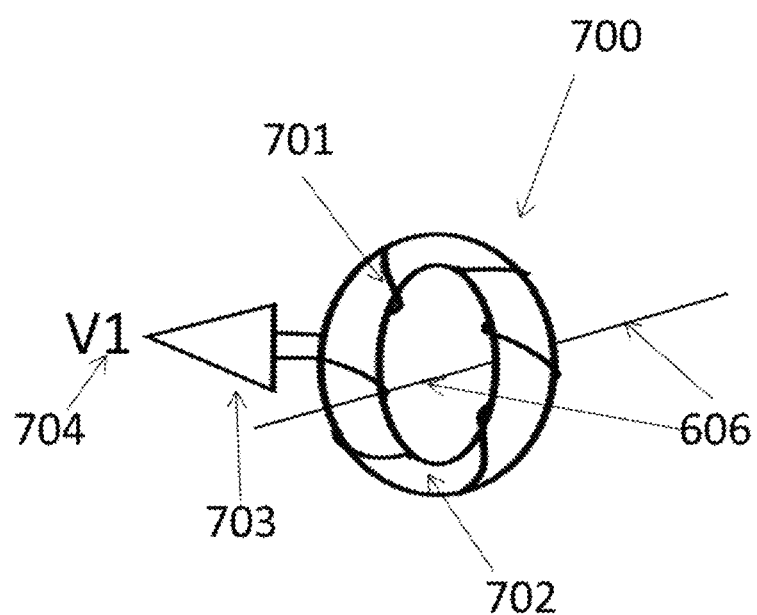
FIG. 7(a) shows a structure of a current measuring circuit, a toroid coil system, installed in the monitor electrode R1.
Figure 7B:
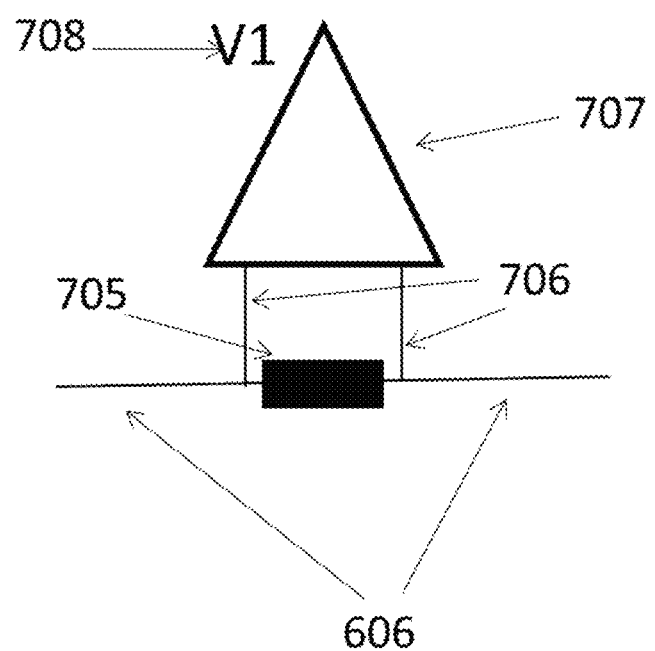
FIG. 7(b) shows a structure of a current measuring circuit, a resistance system, installed in the monitor electrode R1.
Figure 7C:
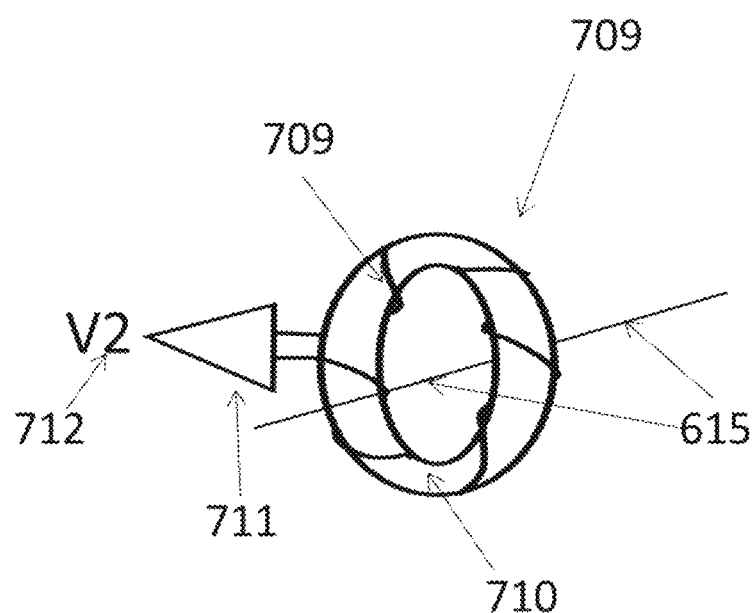
FIG. 7(c) shows a structure of a current measuring circuit, a toroid coil system, installed in the monitor electrode R2.
Figure 7D:
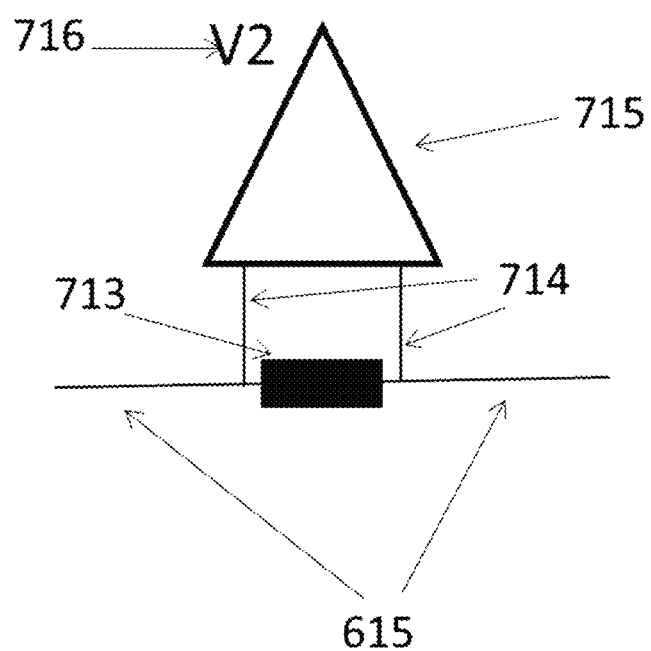
FIG. 7(d) shows a structure of a current measuring circuit, a resistance system, installed in the monitor electrode R2.

FIG. 6 shows the operation principle of the monitoring electrode module. When the upward flowing current 303 passes through the monitoring electrode module R1 107, the current will divide into two parts: the current Iupin1 602 flowing to the sub-monitoring electrode 601 and the current Iup' 603 flowing upwards continually. The current Iupin1 602 flows to the control circuit 608 through the wire 604, the connection point 605 of the sub-monitoring electrode, and the wire 606, and reaches the control system along the wire 609. The current signal at the monitoring electrode module R1 is measured by the current measuring circuit Rtc1 607. The current Iup' 603 flows upward continually, and when passing through the monitoring electrode module R2 108, the current will divide into two parts: the current Iupin2 611 to the sub-monitoring electrode 610 and the current Iup" 612 that continues to flow upward. The current Iupin2 611 passes through the sub-monitoring electrode 610, the wire 613, the sub-monitoring electrode connection point 614, wire 615, flows to control circuit 617, follows wire 618 to the control system. The current signal at the electrode monitor R2 is measured by the current measuring circuit Rtc2 616. All current, including Iupin1 602, Iupin2 611 and Iup" 612, flows back to electrode 304 and return power system.

FIG. 7(*a*) shows a diagram in which a current measuring circuit, the toroid coil system, is installed in the monitoring electrode module R1. A wire 701 is wound on the annular medium 702 and then connected to the measuring circuit 703, and a wire 606 passes through the inside of the toroid coil. When a current passes through the wire 606, the toroid coil 700 will have an induced voltage, and the measuring circuit will measure the induced voltage $V_1$ 704, which can be expressed as $$V_1 = A_1 e^{i\Theta_1} o \quad (2)$$

The annular medium 702 can be made of any material, but magnetic medium is preferred.

FIG. 7(*b*) shows the current measuring circuit, the resistance system, installed in the monitoring electrode module R1. The resistor 705 is connected in series on the wire 606, and the wire 706 is connected to a measuring circuit 707 at both sides of the resistor 705. When a current passes through the wire 606, there is a potential difference $V_1$ across the resistor 705, and the measuring circuit will measure the potential difference $V_1$ 708, which is also expressed by formula (2).

FIG. 7(*c*) shows a current measuring circuit in which a toroid coil system is installed in the monitoring electrode module R2. Wire 709 is wound on annular medium 710 and then connected to measurement circuit 711, and wire 615 passes through the inside of the toroid coil. When a current passes through the wire 615, the toroid coil 709 will have an induced voltage, and the measuring circuit will measure the induced voltage $V_2$ 712, which can be expressed as $$V_2 = A_2 e^{i\Theta_2}. \quad (3)$$

The annular media 706 can be made of any material, but magnetic media is preferred.

FIG. 7 (*d*) shows a current measuring circuit in which a resistance system is installed in the monitoring electrode module R2. The resistor 713 is connected in series on the wire 615, and the wire 714 is connected to the measuring circuit 715 and the both sides of the resistor 713. When a current flows through the wire 615, there is a potential difference V2 across the resistor 713, and the measuring circuit measures the potential difference V2 716, which is also expressed by formula (3).

Calculating the ratio of $V_1$ and V2

$$\text{Ratio} = \frac{V_2}{V_1}, \quad (4)$$

the phase difference Phase$_{up}$ and the amplitude attenuation Att$_{up}$ when the current passes through the monitoring electrode module R1 107 and the monitoring electrode module R2 108 are expressed as:

$$\text{Phase}_{up} = \theta_2 - \theta_1 \quad (5)$$

$$Att_{up} = -20\log\left(\frac{A_2}{A_1}\right) \quad (6)$$

The phase velocity of current Iup' 603 flowing from monitoring electrode module R1 107 to monitoring electrode module R2 108 is $$V_{up}^P = 2\pi f \frac{L}{\text{Phase}_{up}} \quad (7)$$

where f is the frequency of the alternating current, and L is the spacing between R1 107 and R2 108.

The time difference while the alternating current passes through monitoring electrode modules or from the transmitting electrode module to an monitoring electrode module can be computed by analyzing the shape of the electric current pulse emitted by transmitting electrode module and measured by the current measuring circuits installed on the monitoring electrode modules and the transmitting electrode module, and the group velocity can be computed with the time difference and the spacing between the monitoring electrode modules or between the transmitting electrode module and the monitoring electrode module.

Note: FIG. 7 only shows four examples using a "current measuring circuit" to measure the electric signal of the alternating current flowing along the casing, this patent is not limited to these four methods examples.

Figure 8:
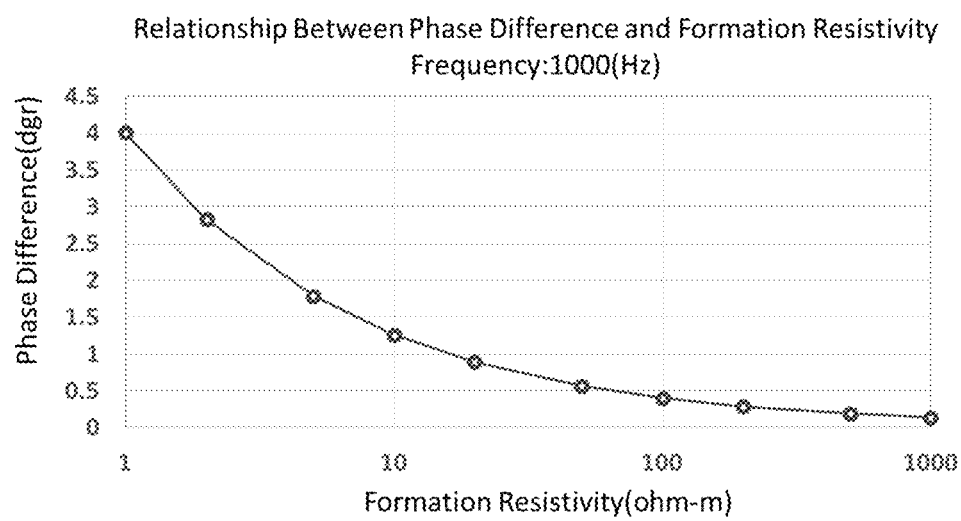
FIG. 8 shows the relationship between the formation resistivity and the phase difference of the alternating current between the monitor electrodes.

FIG. 8 shows the relationship between the formation resistivity and the phase difference of the alternating current between the monitoring electrode modules. The calculation conditions are that the alternating current frequency is 1000 (Hertz), the distance from the monitoring electrode module R1 107 to the monitoring electrode module R2 108 is 1 (meter), and the outer casing resistivity is from 1 to 1000 (ohm-meter), the inner casing resistivity is 1 (ohm-meter).

The figure shows that there is a very good one-to-one correspondence relationship between the phase difference and the formation resistivity. After the phase difference between the monitoring electrode module R1 107 and the monitoring electrode module R2 108 is computed, the relationship shown in FIG. 8 can be used to calculate the formation resistivity outside the casing. Note: The parameters used in the calculation of FIG. 8 are only to show the relationship between the phase difference and the formation resistivity, not to define the operating conditions of the device. The device can have any operating frequency and size.

Figure 9:
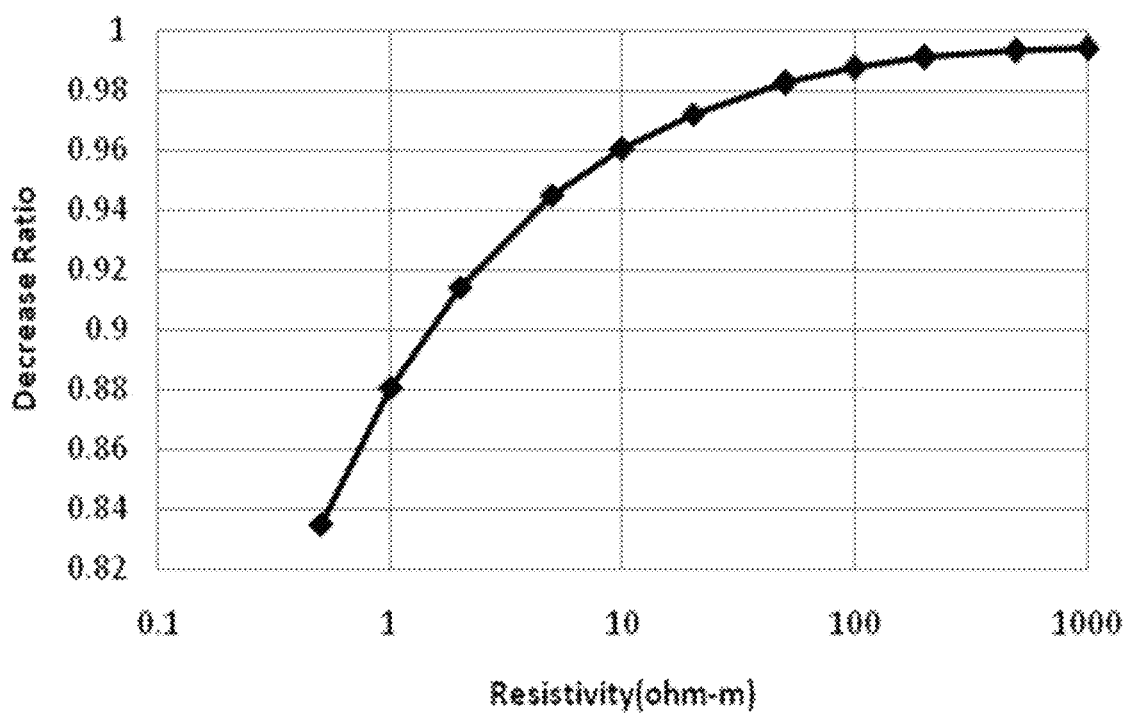
FIG. 9 shows the relationship between the formation resistivity and the attenuation of the alternating current amplitude between the monitor electrode.

FIG. 9 shows the relationship between the formation resistivity and the attenuation of the alternating current amplitude between the monitoring electrode modules. The calculation conditions are that the alternating current frequency is 1000 (Hertz), the distance from the monitoring electrode module R1 107 to the monitoring electrode module R2 108 is 1 (meter), and the outer casing resistivity is from 1 to 1000 (ohm-meter), the inner casing resistivity is 1 (ohm-meter). The figure shows a very good one-to-one correspondence relationship between the current amplitude attenuation and the formation resistivity. After the current amplitude attenuation between the monitoring electrode module R1 107 and the monitoring electrode module R2 108 is measured, the relationship shown in FIG. 9 can be used to calculate the formation resistivity outside the casing.

Note: The parameters used in the calculation of FIG. 9 are only to show the relationship between current amplitude attenuation and formation resistivity, not to define the working conditions of the device. The device can have any operating frequency and size.

Figure 10:
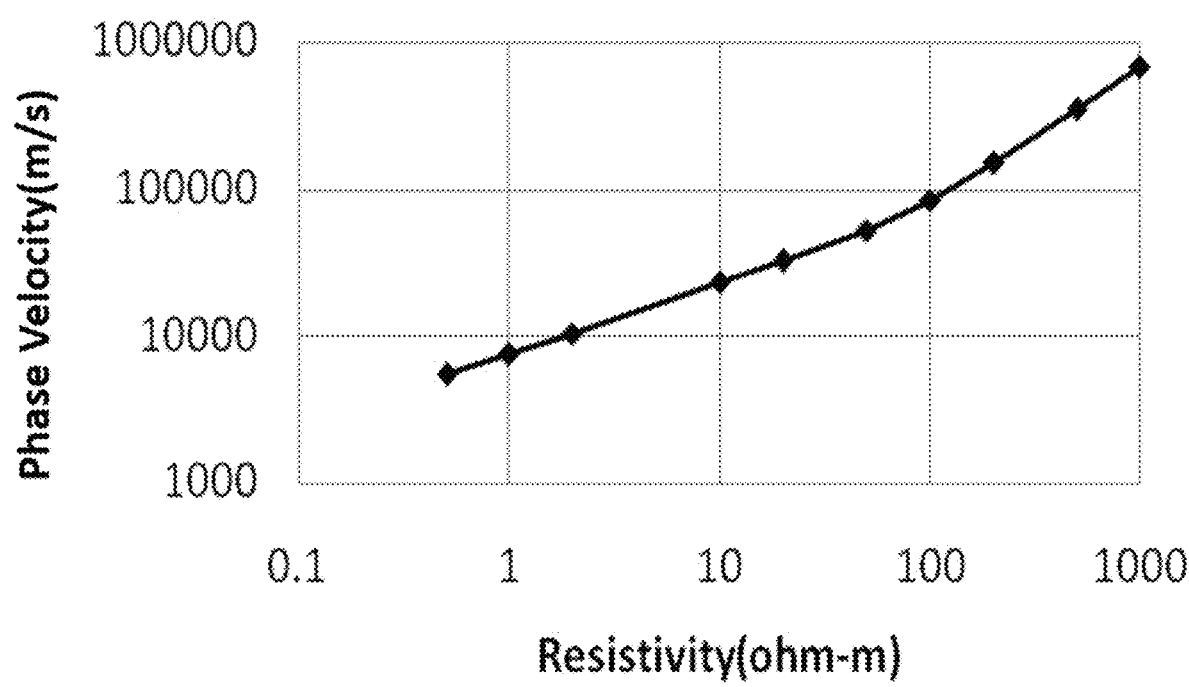
FIG. 10 shows the relationship between formation resistivity and phase velocity of the alternating current flowing between monitor electrodes.

FIG. 10 shows the relationship between the formation resistivity and the phase velocity while the alternating current flows through monitoring electrode modules. The calculation conditions are that the AC frequency is 1000 (Hertz), the distance from the monitoring electrode module R1 107 to the monitoring electrode module R2 108 is 1 (meter), and the outer casing resistivity is from 1 to 1000 (ohm-meter), the inner casing resistivity is 1 (ohm-meter). The figure shows a very good one-to-one correspondence relationship between the phase velocity and the formation resistivity outside the casing. After the phase velocity is computed while the alternating current passes through the monitoring electrode module R1 107 and the monitoring electrode module R2 108, the relationship shown in FIG. 10 can be used to calculate the formation resistivity outside the casing. Similarly, the group velocity while the alternating current passes through the monitoring electrode module R1 107 and the monitoring electrode module R2 108 can be used to calculate the formation resistivity outside the casing too.

Note: The parameters used in the calculation of FIG. 10 are only to show the relationship between the phase velocity and the formation resistivity, not to define the working conditions of the device. Instruments can have any operating frequency and size.

Based on the fact that there is a one-to-one correspondence relationship between the phase velocity of the alternating current flowing through the monitoring electrode modules, the time difference while the alternating current flows through the monitoring electrode modules has a one-to-one correspondence relationship with the formation resistivity outside of the casing. The formation resistivity outside the casing can be calculated using the time difference while the alternating current flows through the monitoring electrode modules. And the formation resistivity outside the casing can be calculated using the time difference while the alternating current flows from the transmitting electrode module to the monitoring electrode module.

Figure 11:
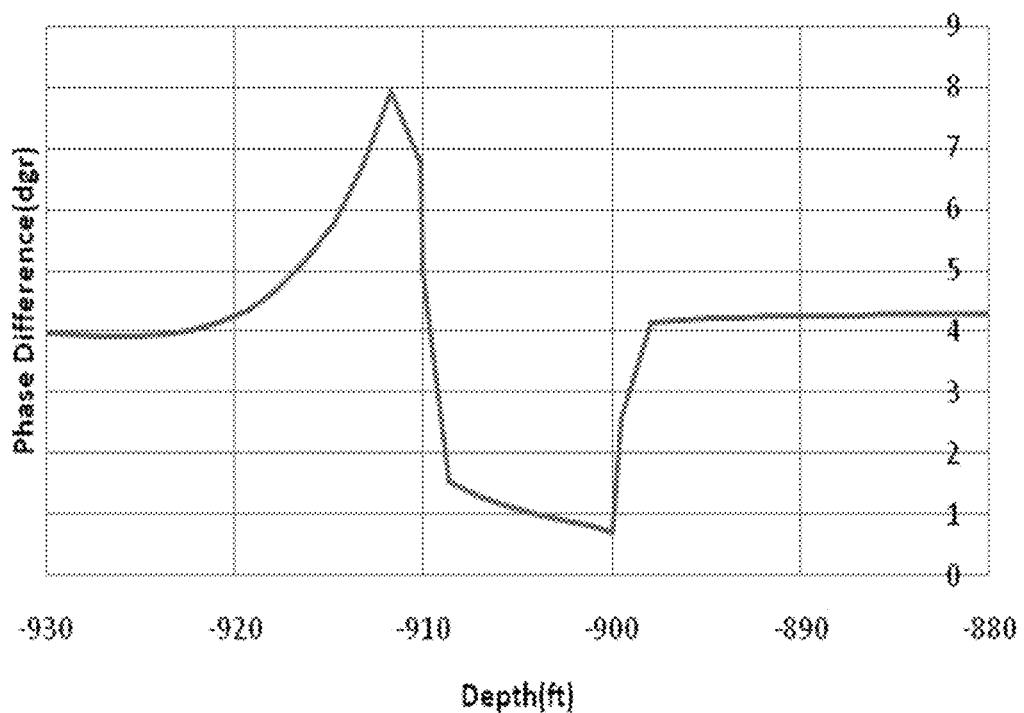
FIG. 11 shows the phase difference curve when the instrument structure shown in FIG. 1 passes through a three-layer medium.

FIG. 11 shows the phase difference curve when the device structure shown in FIG. 1 passes through a three-layer medium. The resistivities of the three formations are 1, 10, and 1 (ohm-meter), respectively, and the thickness of the intermediate formation is 10 (feet). Since the monitoring electrode module s are on the same side of the transmitting electrode module, the phase difference curve is asymmetric.

Figure 12:
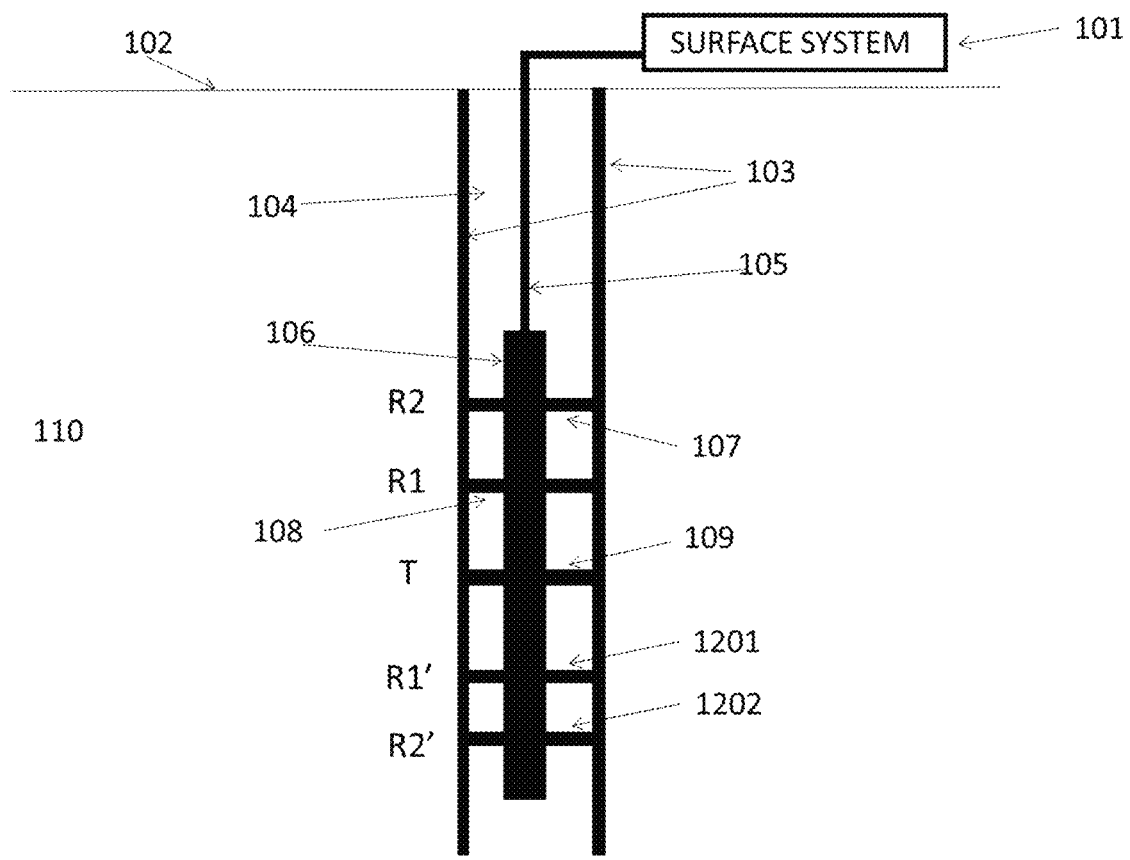
FIG. 12 shows an instrument structure with symmetrical design.

FIG. 12 shows another device structure designed symmetrically. The device structure is that an monitoring electrode module R1' 1201 and another monitoring electrode module R2' 1202 are symmetrically placed below the transmitting electrode module T 109 of the device structure shown in FIG. 1. Symmetric means: the distance from the transmitting electrode module T 109 to the monitoring electrode module R1 107 is the same as the distance from the transmitting electrode module T 109 to the monitoring electrode module R1' 1201, and the distance from the transmitting electrode module T 109 to the monitoring electrode module R2 108 is the same as the distance from the transmitting electrode module T 109 to the monitoring electrode module R2' 1202. Definition: The voltage measured by the monitoring electrode module R1' 1201 is $$V'_1 = A'_1 e^{i\theta'_1}. \tag{8}$$

The voltage measured by the monitoring electrode module R2' 1202 is $$V'_2 = A'_2 e^{i\theta'_2}. \tag{9}$$

Calculate the ratio of $V'_1$ and $V'_2$ $$\text{Ratio}' = \frac{V'_2}{V'_1}. \tag{10}$$

The phase difference Phase$_{dn}$ and the amplitude attenuation Att$_{dn}$ when the alternating current passes through the monitoring electrode module R1' 1201 and the monitoring electrode module R2' 1202 are expressed as:

$$\text{Phase}_{dn} = \theta'_2 - \theta'_1 \tag{11}$$

$$Att_{dn} = -20\log\left(\frac{A'_2}{A'_1}\right) \tag{12}$$

The phase velocity of current Idn 303 flowing from monitoring electrode module R1' 1201 to monitoring electrode module R2' 1202 is $$V^P_{dn} = 2\pi f \frac{L}{\text{Phase}_{dn}} \tag{13}$$

The current phase difference, amplitude attenuation and phase velocity measured by the device structure shown in FIG. 12 are:

$$\text{Phase} = \frac{\text{Phase}_{up} + \text{Phase}_{dn}}{2} \tag{14}$$

$$Att = \frac{Att_{up} + Att_{dn}}{2} \tag{15}$$

$$V^P = \frac{V_{up}^P + V_{dn}^P}{2} \quad (16)$$

Figure 13:
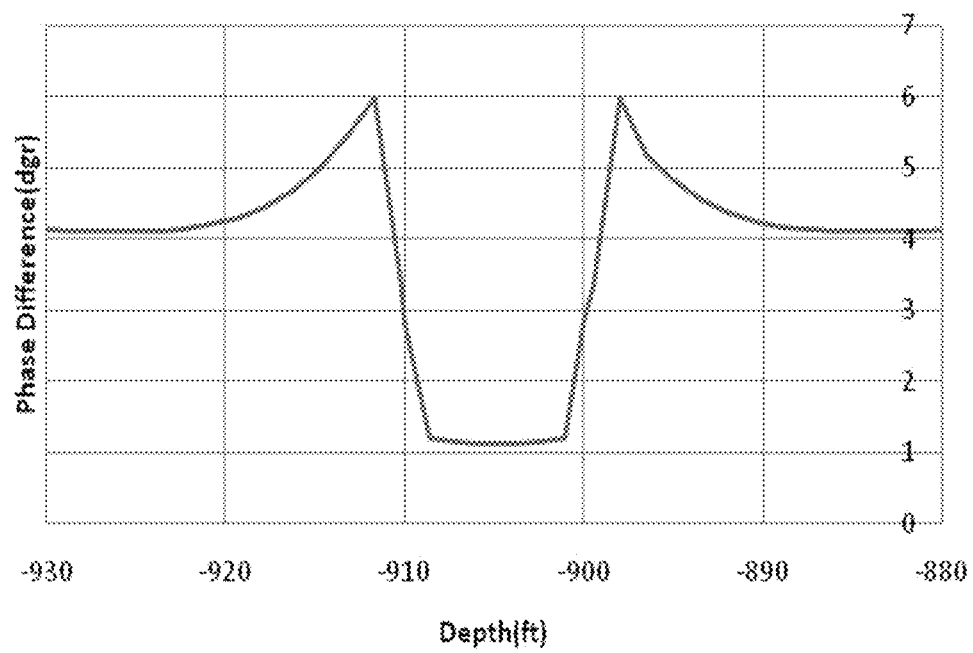
FIG. 13 shows the phase difference curve when the instrument structure shown in FIG. 12 passes through a three-layer medium.

FIG. 13 shows the phase difference curve when the device structure shown in FIG. 12 passes through the three-layer medium. Due to the symmetrical design of the device structure, the calculated phase difference curve is also symmetrical about the middle of the formation.

The equation (2) to equation (16) only can be used to compute formation resistivity outside casing while the alternating current flows between two monitoring electrode modules. However, the ratios between V0 measured by the current measuring circuit installed in the transmitting electrode module and $V_1$, $V_2$, $V'_1$ and $V'_2$ can also be used to compute phase difference, amplitude attenuation, phase velocity while the alternating current flows between the transmitting electrode module and monitoring electrode modules For example: using the formula $$Ratio1 = \frac{V_1}{V_0}, \quad (17)$$

the phase difference, Phase1, and the current amplitude attenuation, Att1, produced by the current flowing from the transmitting electrode module T 109 to the monitoring electrode module R1 107 can be calculated.
By the following formula, $$V_{up}^P = 2\pi f \frac{L_1}{Phase_1}, \quad (18)$$

the phase velocity of the alternating current flowing from transmitting electrode module T 109 to monitoring electrode module R1 107 can be calculated.

The phase difference, amplitude attenuation and phase velocity calculated from the transmitting electrode module to each monitoring electrode module can be used to calculate the formation resistivity outside the casing, and the time difference while the current flows from the transmitting electrode module to the monitoring electrode module can be used to calculate the formation resistivity outside the casing.

In one embodiment, the present invention provides a method for measuring alternating current outside the casing. The monitoring electrode module is connected to the return electrode of the control system through a wire, and the current flows to the return electrode. A current measuring circuit is installed on the monitoring electrode module and measure alternating current signal passing the monitoring electrode module, and the measured alternating current signal by the current measuring circuit reflects the current parameter when the alternating current outside the casing passes through the monitoring electrode module.

In one embodiment, the present invention provides a method for measuring the alternating current outside the casing, the monitoring electrode module is connected to the metal casing through a wire, and part of the current passes through the monitoring electrode module in which a current measuring circuit is installed, the wire, the casing, the formation, and flows to the return electrode. The measured alternating current signal by the current measuring circuit reflects the current parameter when the alternating current outside the casing passes through the monitoring electrode module.

In one embodiment, the present invention provides a method for measuring the alternating current outside the casing, the monitoring electrode module is connected to the electrode on ground through a wire, part of the current passing through the monitoring electrode modules, wires, electrodes and the electrode on ground flows back to return electrodes. Current measuring circuits are installed on the monitoring electrode modules and measure alternating current signal of the alternating current passing the monitoring electrode modules. The measured alternating current signal by the current measuring circuit reflects the current parameters when the alternating current flows outside the casing through the monitoring electrode module.

In one embodiment, the present invention provides a method of measuring alternating current when the alternating current flows out of the transmitting electrode module, the current measuring circuit is installed on the transmitting electrode module and measure the alternating current signal of the alternating current flowing out the transmitting electrode module, and the measured alternating current signal reflects the current parameter when the alternating current flows out the transmitting electrode module.

In one embodiment, the present invention provides a method for measuring the phase difference when the alternating current outside the casing flows through the monitoring electrode $$\frac{V_2}{V_1},$$

modules. The ratio, can be used to compute the phase difference and current amplitude decay while the alternating current flows between monitoring electrode modules R1 and R2, where $V_1$ is the measurement of the monitoring electrode module R1, and $V_2$ is the measurement of the monitoring electrode module R2.

In one embodiment, the present invention provides a method for measuring the phase velocity of the alternating current outside the casing flowing between the monitoring electrode modules.

$$Ratio = \frac{V_2}{V_1}$$

can be used to compute the phase difference, Phase, and to compute phase velocity $$V^P = 2\pi f \frac{L}{Phase}$$

while the alternating current flows between monitoring electrode modules, where $V_1$ is the measurement of the monitoring electrode module R1, and $V_2$ is the measurement of the monitoring electrode module R2.

In one embodiment, the present invention provides a method for measuring the alternating current decay while the alternating current flows between monitoring electrode modules. Using $$Ratio = \frac{V_2}{V_1},$$

the current amplitude attenuation can be expressed as Att=−20 log (|Ratio|). where $V_1$ is the measurement of the monitoring electrode module R1, and $V_2$ is the measurement of the monitoring electrode module R2.

In one embodiment, the present invention provides a method for measuring the phase difference between the transmitting electrode module and the monitoring electrode module, while the alternating current flows from the transmitting electrode module to the monitoring electrode module. Formula $$\text{Ratio} = \frac{V_R}{V_T}$$

is used to compute the phase difference, where $V_T$ is the measurement of the current measuring circuit on transmitting electrode module, $V_R$ is the measurement of the current measuring circuit on monitoring electrode module R.

In one embodiment, the present invention provides a method for measuring the phase velocity while the alternating current flows from the transmitting electrode module to an monitoring electrode module.

$$\text{Ratio} = \frac{V_R}{V_T}$$

is used to compute the phase difference, phase, and $$V^P = 2\pi f \frac{L}{\text{Phase}}$$

is used to calculate the phase velocity, where $V_T$ is the measurement of the current measuring circuit on transmitting electrode module, $V_R$ is the measurement of the current measuring circuit on monitoring electrode module R, f is the frequency, and L is the spacing between the transmitting electrode module and the monitoring electrode module.

In one embodiment, the invention provides a cross casing resistivity device, using the alternating current phase difference between monitoring electrode modules to calculate the formation resistivity outer casing.

In one embodiment, the invention provides a cross casing resistivity device, using the alternating current attenuation between monitoring electrode modules to calculate the formation resistivity outer casing.

In one embodiment, the invention provides a cross casing resistivity device, using the alternating current phase velocity between monitoring electrode modules to calculate the formation resistivity outer casing.

In one embodiment, the invention provides a cross casing resistivity device, using the time difference while alternating current flows between monitoring electrode modules to calculate the formation resistivity outer casing.

In one embodiment, the invention provides a cross casing resistivity device, using the alternating current phase difference between transmitting electrode module and monitoring electrode module to calculate the formation resistivity outer casing.

In one embodiment, the invention provides a cross casing resistivity device, using the alternating current attenuation between transmitting electrode module and monitoring electrode module to calculate the formation resistivity outer casing.

In one embodiment, the invention provides a cross casing resistivity device, using the alternating current phase velocity between transmitting electrode module and monitoring electrode module to calculate the formation resistivity outer casing.

In one embodiment, the invention provides a cross casing resistivity device, using the time difference while alternating current flows between transmitting electrode module and monitoring electrode module to calculate the formation resistivity outer casing.

In one embodiment, the invention provides a cross casing resistivity measurement system, and transmitting electrode module contacts with casing, and in another embodiment, transmitting electrode module does not contact with casing.

In one embodiment, the present invention provides a cross casing resistivity measurement system that the monitoring electrode module contact the casing, and in another embodiment, the monitoring electrode module does not contact with casing.

What is claimed is:

1. A device for measuring cross casing resistivity comprising: at least one electrode transmitter, at least one electrode receiver, at least one current measuring circuit disposed adjacent to the at least one electrode transmitter or at least one electrode receiver for measuring alternating current signal flowing through the electrode receiver along the casing, a power source, and a processor configured for calculating at least one parameter for current propagation along the casing based on the alternating current signal and for calculating resistivity of formation outside the casing based on the at least one parameter for current propagation along the casing, wherein: the alternating current signal is selected from the group consisting of amplitude, phase, and combinations thereof; alternating current emitted by the electrode transmitter partially or entirely flows through the electrode monitor back to the power source, and the parameter for current propagation along the casing is selected from the group consisting of: time difference, phase velocity, group velocity, phase difference, amplitude attenuation, and combinations thereof.

2. The device according to claim 1, wherein the at least one current measuring circuit is disposed adjacent to the electrode receiver for measuring the alternating current signal when the alternating current flows through the electrode receiver along the casing.

3. The device according to claim 1 comprising two electrode receivers, wherein the at least one current measuring circuit is a plurality of current measuring circuits, each of the two electrode receivers is disposed adjacent to at least one of the plurality of current measuring circuits for measuring the alternating current signal, and wherein the processor is configured to calculate the phase difference of the alternating current when the alternating current passes the two electrode receivers.

4. The device according to claim 1 comprising two electrode receivers, wherein the at least one current measuring circuit is a plurality of current measuring circuits, wherein each of the two electrode receivers is disposed adjacent to the at least one of the plurality of current measuring circuits for measuring the alternating current signal, and wherein the processor is configured to calculate the attenuation of the alternating current when the alternating current passes the two electrode receivers.

5. The device according to claim 1 comprising two electrode receivers, wherein the at least one current measuring circuit comprises at least two current measuring circuits, each of the two electrode receivers is disposed adjacent to at least one of the at least two current measuring circuits for measuring the alternating current signal, and wherein the processor is configured to calculate the time difference of the alternating current flowing when the alternating current passes the two electrode receivers.

6. The device according to claim 1 comprising two electrode receivers, wherein the at least one current measuring circuit comprises at least two current measuring circuits, each of the two electrode receivers is disposed adjacent to at least one of the at least two current measuring circuit for measuring the alternating current signal, and wherein the processor is configured to calculate the phase velocity and group velocity of the alternating current when the alternating current passes the two electrode receivers.

7. The device according to claim 1 wherein the at least one current measuring circuit is a plurality of current measuring circuits, the at least one electrode transmitter is disposed adjacent to the at least one of the plurality of current measuring circuits, and the at least one electrode receiver is disposed adjacent to the at least one of the plurality of current measuring circuits, respectively, for measuring the alternating current signal, and wherein the processor is configured to calculate the phase difference of the alternating current when the alternating current flows from the at least one electrode transmitter to the at least one electrode receiver.

8. The device according to claim 1 wherein the at least one current measuring circuit is a plurality of current measuring circuits, the at least one electrode transmitter is installed with at least one of the plurality of current measuring circuits, and the at least one electrode receiver is disposed adjacent to the at least one of the plurality of current measuring circuits, respectively, for measuring the alternating current signal, and wherein the processor is configured to calculate the time difference of the alternating current flowing when the alternating current flows from the at least one electrode transmitter to the at least one electrode receiver.

9. The device according to claim 1 wherein the at least one current measuring circuit is a plurality of current measuring circuits, the at least one electrode transmitter is installed with at least one of the plurality of current measuring circuits, and the at least one electrode receiver is disposed adjacent to the at least one of the plurality of current measuring circuits, respectively, for measuring the alternating current signal, and wherein the processor is configured to calculate the phase velocity and/or group velocity of the alternating current when the alternating current flows from the at least one electrode transmitter to the at least one electrode receiver.

10. The device according to claim 1 wherein the processor is configured to compute the formation resistivity outside the casing based on the phase difference.

11. The device according to claim 1 wherein the processor is configured to compute the formation resistivity outside the casing based on the phase velocity.

12. The device according to claim 1 wherein the processor is configured, to compute the formation resistivity outside the casing based on the group velocity.

13. The device according to claim 1 wherein the processor is configured to compute the formation resistivity outside the casing based on the attenuation.

14. The device according to claim 1 wherein the processor is configured to compute the formation resistivity outside the casing based on the time difference.

15. A method of measuring cross casing resistivity comprising:
measuring alternating current signal flowing through at least one electrode receiver along the casing with a first current measuring circuit disposed adjacent to the at least one electrode receiver;
calculating via a processor at least one parameter for current propagation along the casing based on the alternating current signal measured in the measuring step; and
calculating resistivity of formation outside the casing based on the at least one parameter for current propagation along the casing,
wherein:
the alternating current signal is selected from the group consisting of amplitude, phase, and combination thereof; and the at least one parameter for current propagation along the casing is selected from the group consisting of time difference, phase velocity, group velocity, phase difference, amplitude attenuation, and combinations thereof.

16. The method of claim 15 comprising:
disposing a second current measuring circuit adjacent to an electrode transmitter;
measuring the alternating current signal through the two current measuring circuits; and
calculating the at least one parameter for current propagation along the casing with the processor when the alternating current flows from the electrode transmitter to the at least one electrode receiver.

17. The method of claim 15, wherein the current measuring circuit comprises two current measuring circuits, the at least one electrode receiver comprises two electrode receivers, and wherein the method comprises:
disposing one of the two current measuring circuits adjacent to each of the two electrode receivers, respectively;
measuring the alternating current signal through the two current measuring circuits; and
calculating at least one parameter for current propagation along the casing with the processor.

18. The method of claim 15 wherein the at least one parameter for current propagation along the casing is the group velocity.

19. The method of claim 15 wherein the at least one parameter for current propagation along the casing is phase difference.

20. The method of claim 15 wherein the at least one parameter for current propagation along the casing is the phase velocity.

21. The method of claim 15 wherein the at least one parameter for current propagation along the casing is the time difference.

* * * * *